US011002016B2

(12) United States Patent
Allesen

(10) Patent No.: US 11,002,016 B2
(45) Date of Patent: May 11, 2021

(54) CONNECTOR ELEMENT FOR A FLASHING ASSEMBLY FOR USE IN A ROOF WINDOW ARRANGEMENT, AND A METHOD FOR WEATHER PROOFING A ROOF WINDOW ARRANGEMENT

(71) Applicant: VKR Holding A/S, Hørsholm (DK)

(72) Inventor: Torben Krogsgaard Allesen, Horsens (DK)

(73) Assignee: VKR Holding A/S

( * ) Notice: Subject to any disclaimer, the term of this patent is extended or adjusted under 35 U.S.C. 154(b) by 0 days.

(21) Appl. No.: 16/737,834

(22) Filed: Jan. 8, 2020

(65) Prior Publication Data

US 2020/0224421 A1 Jul. 16, 2020

(30) Foreign Application Priority Data

Jan. 10, 2019 (DK) .......................... PA 2019 70014

(51) Int. Cl.
*E04D 13/03* (2006.01)
*E04D 3/366* (2006.01)
(Continued)

(52) U.S. Cl.
CPC .......... *E04D 13/031* (2013.01); *E04D 3/366* (2013.01); *E04D 13/1475* (2013.01);
(Continued)

(58) Field of Classification Search
CPC ... E04D 13/031; E04D 13/1475; E04D 13/02; E04D 3/366; E05Y 2900/154
See application file for complete search history.

(56) References Cited

U.S. PATENT DOCUMENTS

| 4,621,466 A | 11/1986 | Sonneborn |
| 7,658,356 B1 | 2/2010 | Nehls |

(Continued)

FOREIGN PATENT DOCUMENTS

| DE | 7829553 | 1/1979 |
| DE | 7920893 | 11/1986 |

(Continued)

OTHER PUBLICATIONS

Danish Search Report issued in Danish Patent Application No. PA2019 70015 dated Jun. 6, 2019, four pages.

(Continued)

*Primary Examiner* — Adriana Figueroa
(74) *Attorney, Agent, or Firm* — Merek, Blackmon & Voorhees, LLC

(57) ABSTRACT

A connector element for a flashing assembly for use in a roof window arrangement is disclosed. The exterior side of the connector element comprises a gutter with two longitudinal edges configured for engagement with an engagement section of a flashing member. A connecting section is configured for being connected to a bracket used for connecting a roof window to a load-bearing structure of the roof structure. The connector element is configured for being arranged with a first end at an outer side of a bottom frame member of a first roof window and a second end at a second roof window. At least one attachment element is provided on an end surface at the second end, said attachment element being adapted for engagement with a supporting element of a flashing assembly. A method for weather proofing a roof window arrangement is also disclosed.

18 Claims, 4 Drawing Sheets

Figure 1:
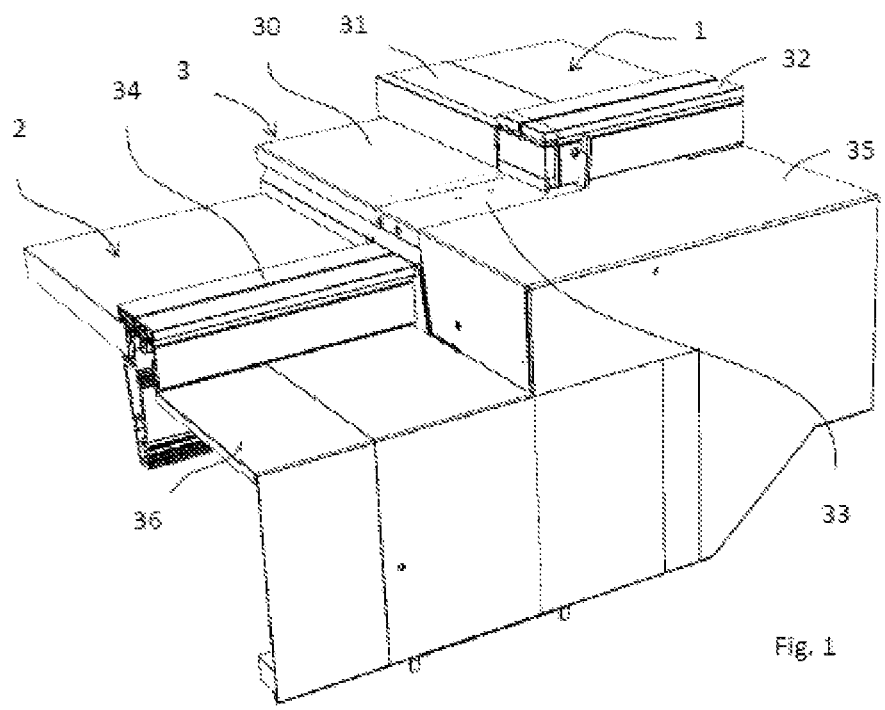

(51) Int. Cl.
  *E04D 13/147* (2006.01)
  *H02S 20/23* (2014.01)
  *F24S 25/61* (2018.01)
  *E04D 13/02* (2006.01)

(52) U.S. Cl.
  CPC ......... *E04D 13/02* (2013.01); *E05Y 2900/154* (2013.01); *F24S 25/61* (2018.05); *H02S 20/23* (2014.12)

(56) References Cited

U.S. PATENT DOCUMENTS

| | | | |
|---|---|---|---|
| 8,720,134 B2 * | 5/2014 | Lindgren | E04D 13/0315 52/204.1 |
| 9,140,050 B2 * | 9/2015 | Lindgren | E06B 1/36 |
| D750,804 S * | 3/2016 | Allesen | D25/48.7 |
| 9,482,009 B2 * | 11/2016 | Krogsgaard | E04D 13/03 |
| 2011/0277402 A1 | 11/2011 | Schnitzer | |
| 2012/0167483 A1 | 7/2012 | Lindgren et al. | |
| 2014/0305046 A1 | 10/2014 | Stearns et al. | |
| 2014/0366468 A1 | 12/2014 | Lindgren et al. | |
| 2015/0267412 A1 | 9/2015 | McClure | |

FOREIGN PATENT DOCUMENTS

| | | | |
|---|---|---|---|
| DE | 20206327 | 7/2002 | |
| DE | 202012006688 | 10/2013 | |
| DE | 202012006688 U1 * | 10/2013 | ......... E04D 13/0354 |
| DE | 202014000149 | 5/2014 | |
| DK | 201670572 | 3/2018 | |
| EP | 0087647 | 9/1983 | |
| EP | 0428921 | 5/1991 | |
| EP | 1533436 | 5/2005 | |
| EP | 2472025 | 7/2012 | |
| EP | 2472029 A1 * | 7/2012 | ........... E04D 13/031 |
| EP | 2472043 | 7/2012 | |
| EP | 2472043 A1 * | 7/2012 | ......... E04D 13/0354 |
| EP | 2752531 | 7/2014 | |
| EP | 3039198 | 7/2016 | |
| EP | 3252256 | 12/2017 | |
| EP | 3282064 | 2/2018 | |
| EP | 3282064 A1 * | 2/2018 | ......... E04D 13/1475 |
| EP | 2752531 B1 * | 8/2019 | ......... E04D 13/1475 |
| FR | 2473595 A1 * | 7/1981 | ......... E04D 13/1475 |
| WO | WO 2004/055294 | 7/2004 | |
| WO | WO-2004055291 A1 * | 7/2004 | ............ E04D 13/02 |
| WO | WO2005/116365 | 12/2005 | |
| WO | W02015028030 | 3/2015 | |
| WO | WO 2015/028032 | 3/2015 | |
| WO | WO-2015028032 A1 * | 3/2015 | ......... E04D 13/0354 |

OTHER PUBLICATIONS

Danish Search Report issued in Danish Patent Application No. PA2019 70016 dated Aug. 27, 2019, four pages.
Danish Search Report issued in Danish Patent Application No. PA2019 70013 dated Jun. 28, 2019, four pages.
Danish Search Report issued in Danish Patent Application No. PA2019 70014 dated Jun. 25, 2019, four pages.
U.S. Appl. No. 16/737,802, filed Jan. 8, 2020 as entitled "A Middle Flashing Assembly and a Method for Weather-proofing a Roof Window Arrangement".
U.S. Appl. No. 16/737,811, filed Jan. 8, 2020 as entitled "An End Closure for a Cladding for a Roof Window and a Roof Window Arrangement".
U.S. Appl. No. 16/737,820, filed Jan. 8, 2020 as entitled "A Connector Bracket for Interconnecting Roof Windows, a Roof Window Arrangement, and a Method for Mounting at least two Windows in an Inclined Roof Structure".
Machine generated translation of DE7829553.
Machine generated translation of DE202012006688.
Machine generated translation of DE7920893.
European Search Report dated May 25, 2020, 5 Pages Issued in Connection With European Application No. 20150912 Which is Related to U.S. Appl. No. 16/737,802.
European Extended Search Report dated Jun. 16, 2020, 5 Pages Issued in Connection With European Application No. 20150914 Which is Related to U.S. Appl. No. 16/737,811.
European Extended Search Report dated Apr. 23, 2020, 8 Pages Issued in Connection With European Application No. 20150910 Which is Related to U.S. Appl. No. 16/737,820.
European Extended Search Report dated May 29, 2020, 8 Pages Issued in Connection With European Application No. 20150909 Which is Related to U.S. Appl. No. 16/737,834.
Machine generated translation of DE202014000149.
Extended European Search Report dated May 29, 2020 issued in connection with European Application No. 20150909, eight (8) pages.

* cited by examiner

CONNECTOR ELEMENT FOR A FLASHING ASSEMBLY FOR USE IN A ROOF WINDOW ARRANGEMENT, AND A METHOD FOR WEATHER PROOFING A ROOF WINDOW ARRANGEMENT

The present invention relates to a connector element for a flashing assembly for use in a roof window arrangement in an inclined roof structure including at least two roof windows, said connector element being configured for being arranged with an exterior side facing the exterior in the mounted state, an interior side facing the roof structure, a first end facing a first roof window, and a length direction of the connector element extending from the first end towards a second opposite open end, where the exterior side comprises a gutter with two longitudinal edges extending between the first and second ends, at least one of said longitudinal edges being configured for engagement with an engagement section of a flashing member, and where a connecting section on the interior side is configured for being connected to a bracket used for connecting a roof window to a load-bearing structure of the roof structure. The invention further relates to a roof window arrangement including such a connector element and to a method for weather proofing a roof window arrangement.

A connector element of this type is known from EP3039198. This connector element, however, is configured for use where roof windows are mounted side-by-side and is not well suited for use in roof window arrangements, where the windows are mounted one below the other when seen in the direction of inclination of the roof structure.

It is therefore the object of the invention to provide a connector element, which is configured for use in roof window arrangements, where one roof window is located below the other roof window when seen in the direction of inclination of the roof structure, and a method for weather proofing such a roof window arrangement.

In a first aspect of the invention this is achieved with a connector element which is configured for being arranged with the first end at an outer side of a bottom frame member of the first roof window and the second end at an exterior side of the second roof window, where the connector element comprises an end surface at the second end, said end surface extending from the exterior side towards the interior side and being non-parallel to the length direction, and where at least one attachment element is provided on the end surface, said attachment element being adapted for engagement with a supporting element of a flashing assembly.

By arranging the connector element with the first end at an outer side of a bottom frame member of the first roof window and the second end at an exterior side of the second roof window, any water condensing at the pane of the first roof window may be drained off onto the exterior side of the second roof window via the gutter. It is noted that the wording "outer side" is here intended to mean a side extending between the exterior side of the roof window facing the exterior and the interior side of the roof window facing the interior covered by the roof structure.

By providing the connector element with one or more attachment elements on the end surface at the second end, a supporting element may be attached to it thereby allowing the connector element to not only support a flashing member engaging with the longitudinal edge of the gutter but to also transfer loads from other parts of the flashing assembly to a bracket used for connecting a roof window to a load-bearing structure of the roof structure. In use, the longitudinal edges of the gutter will typically support an end of a middle flashing member extending between the first and second roof windows. The attachment element may then for example be used for the attachment of a support rail extending along the length of the middle flashing member, i.e. in parallel with the top frame member of the second roof window. Such a supporting rail may for example be used for supporting the middle flashing member, so that it does not sag, and/or for supporting a gasket. The attachment element may for example also be used for attachment of a side flashing member supporting element. Further details and examples will be given below.

It is presently preferred that the end surface extends from one or both of the longitudinal edges away from the gutter, so that the attachment element(s) do(es) not block the open end of the gutter.

In one embodiment the/each attachment element includes a male part adapted for engagement with an opening or depression in or on a supporting element. This provides for a relatively easy engagement between the connector element and the supporting element, and alignment between the male part and the opening or depression will serve as an indication that the supporting element has been positioned correctly. In case of an opening, the appearance of the male part within the opening will indicate correct engagement, but a tactile feed-back may also help to determine correct engagement. The engagement between the opening or depression and the male part may be a simple engagement where one fits over the other, but it is also possible to achieve a snap-locking engagement. It is also within the scope of the invention to use a female attachment element adapted for engagement with a projection on the supporting element.

The engagement between a male or female part of an attachment element and a corresponding part on a supporting element may serve as a temporary interconnection, which is later supplemented with another connection, such as a screw connection.

The attachment element may include an elongate receiver adapted for receiving an elongate fastener, such as a screw. The length direction of the elongate receiver is preferably substantially parallel to the length direction of the connector element, but may extend at other angles if needed in order to achieve an optimal attachment of the supporting element, or in order to give room for other items located on or at the connector element in the mounted state.

If the elongate receiver is intended to receive a screw, it is preferably made from a polymer with sufficient plasticity and/or elasticity to allow the thread of the screw to cut into it without causing unintentional damage. Examples of such materials are acrylonitrile butadiene styrene (ABS), polyethylene (PE), polypropylene (PP) and polyvinylchloride (PVC).

In one embodiment, the entire connector element is made from the same material. It may be made in one piece, for example by moulding or 3D printing, but it may also be advantageous to assemble it from two or more parts.

The connector element may have an end surface with an attachment element on both sides of the gutter, and in one embodiment these end surfaces and the attachment elements on the two sides of the gutter are substantially identical except for being mirror inverted, so that the connector element is substantially symmetrical. Making the connector element symmetrical reduces the risk of errors in the mounting process, where connector elements are mounted at both sides of the roof windows.

A second aspect of the invention relates to a roof window arrangement for use in an inclined roof structure including at least two roof windows, where a first roof window is located above a second roof window when seen in the direction of inclination of the roof structure, and a flashing assembly, said flashing assembly including at least one connector element as described above arranged with the first end at an outer side of a bottom frame member of the first roof window and the second end at an exterior side of the second roof window, at least a middle flashing member extending between the two roof windows, and a supporting element adapted for supporting one or more flashing members, said supporting element being attached to at least one attachment element of the connector element. This roof window arrangement provides for an improved attachment of the flashing members of the flashing assembly, where loads can be transferred to the load-bearing structure via the connector element and brackets used for connecting a roof window to a load-bearing structure of the roof structure and do not have to be transferred via the frames of the roof windows. This may for example be advantageous where the frames of the roof windows are made from materials, which are not easily penetrated by screws or like fasteners, or where attachment to the frames are undesired, for example to avoid thermal bridges.

In a third aspect of the invention, the object is achieved with a method for weather proofing a roof window arrangement including at least two roof windows mounted in an inclined roof structure, a first roof window above a second roof window when seen in the direction of inclination of the roof structure, said method comprising the following steps:

connecting a connecting section of a connector element to a bracket used for connecting a roof window to a load-bearing structure of the roof structure, so that said connector element is arranged between the first roof window and the second roof window with an exterior side facing the exterior, an interior side facing the roof structure, a first end facing the first roof window and a second open end being arranged at the second roof window, a length direction of the connector element extending from the first end towards the second end, arranging a middle flashing member so that it extends between the two roof windows and so that an engagement section of the middle flashing member is in engagement with a longitudinal edge delimiting a gutter extending between the first and second ends on the exterior side of the connector element, attaching a supporting element of a flashing assembly to an attachment element provided on an end surface at the second end of said connector element, said end surface extending from the exterior side towards the interior side and being non-parallel to the length direction, and arranging at least one flashing member of the flashing assembly so that it is supported by the supporting element.

The order of the steps may vary. For example, it may be advantageous to attach the supporting element before bringing the middle flashing member in engagement with the connector element. The method may include further steps, such as covering the connector element with a connector flashing member.

Embodiments and advantages described with reference to one aspect of the invention also applies to the other aspects of the invention unless otherwise stated.

Figure 2:
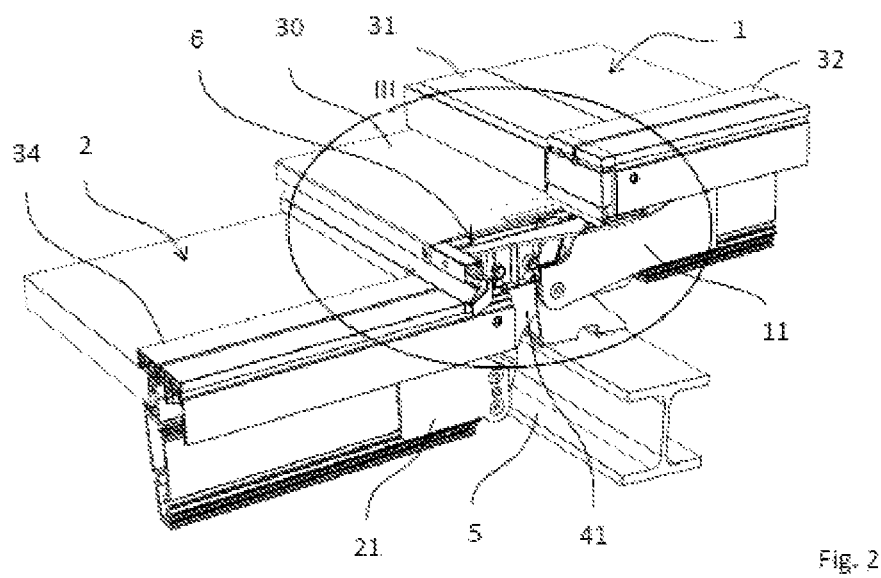
Figure 3:
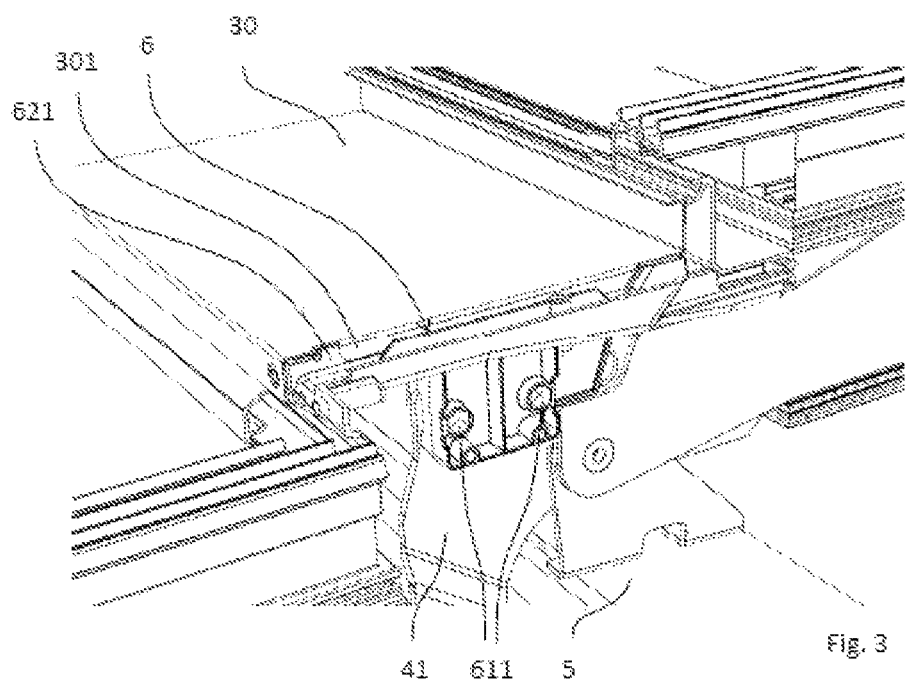
Figure 4:
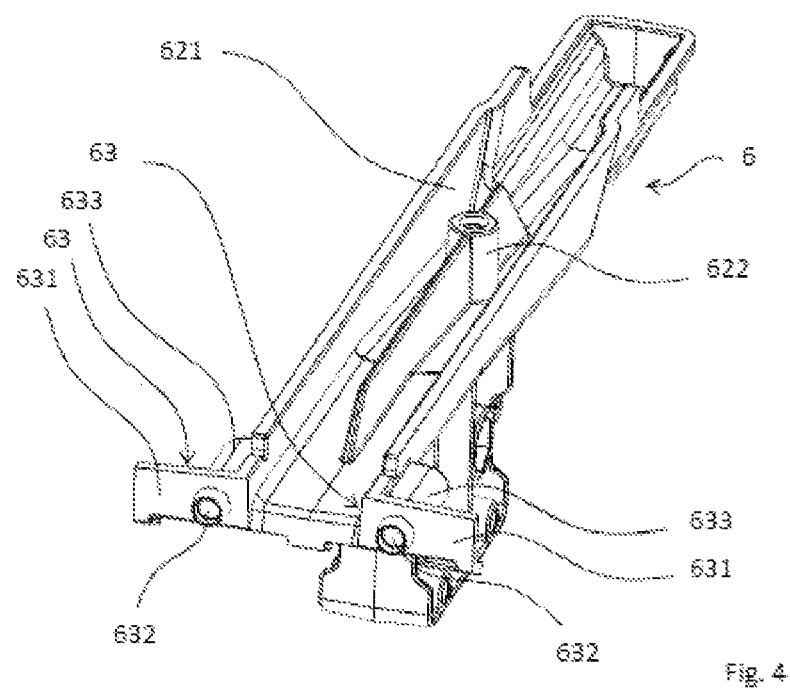
Figure 5:
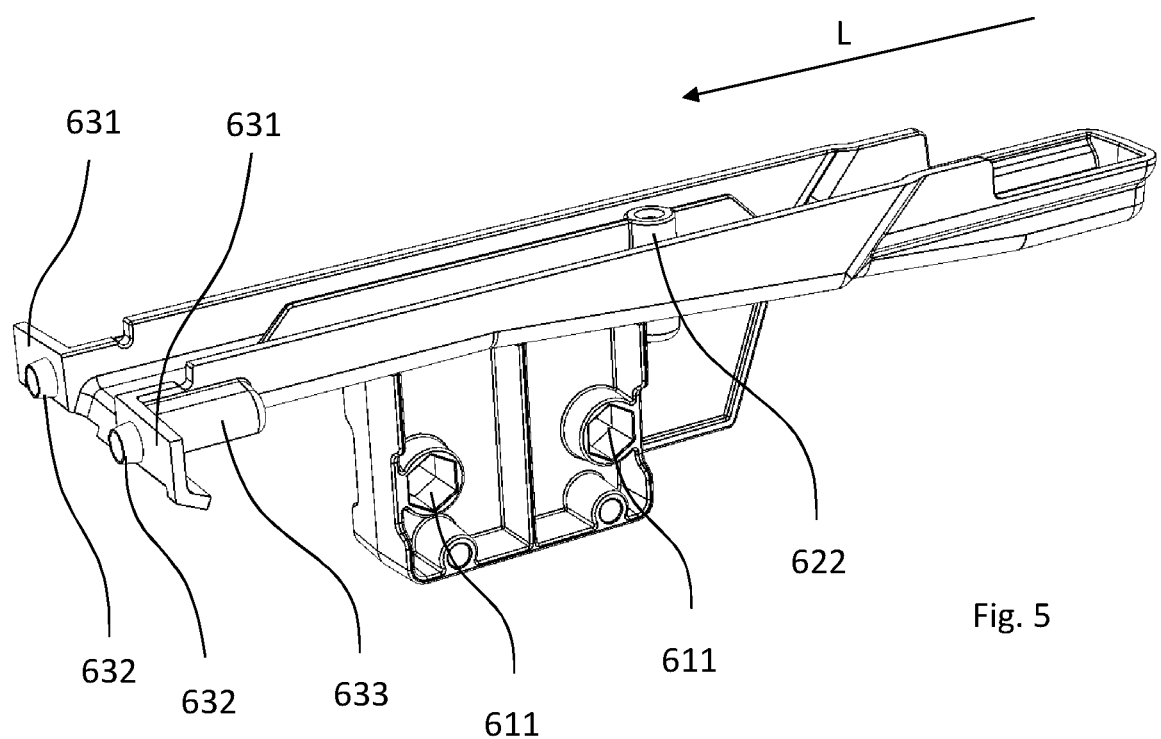
Figure 6:
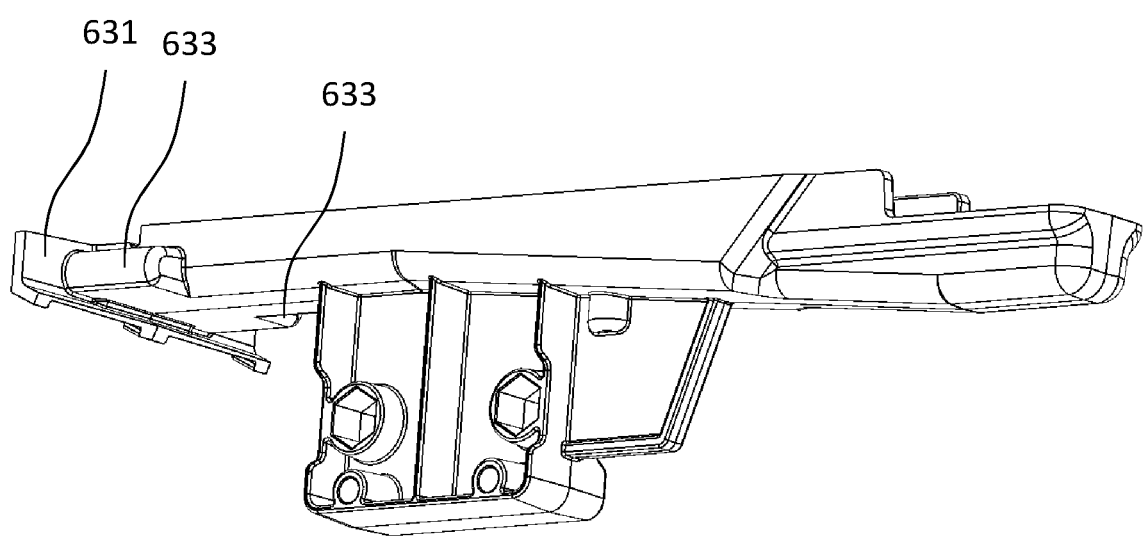

In the following the invention will be described in more detail with reference to the non-limiting embodiments shown in the drawing, where:

FIG. 1 is a perspective partially cut-away view of a roof window arrangement according to the invention, FIG. 2 corresponds to FIG. 1 but with some of the flashing members removed, FIG. 3 shows the detail marked III in FIG. 2, where covering and cladding members of the flashing assembly have been removed, FIG. 4 is a perspective view of a connector element according to the invention, FIG. 5 is a perspective view of the connector element in FIG. 4 from a different angle, FIG. 6 is a perspective view of the connector element in FIGS. 4 and 5 from yet another angle, and FIGS. 7-11 are perspective views of different stages of the construction of a roof window arrangement, each view corresponding substantially to the view in FIG. 3, but seen from a different angle.

A roof window arrangement in an inclined roof structure including a first roof window 1 located above a second roof window 2 when seen in the direction of inclination of the roof structure is seen in FIG. 1. In addition to the roof windows, it comprises a flashing assembly 3 which includes a middle flashing member 30 extending between the two roof windows, a bottom covering 31 and a cladding 32 on the first roof window, a cladding 34 on the second roof window, side flashing members 35, 36 at the first and second roof windows, respectively. Furthermore, it includes a connector flashing member 33 extending between the middle flashing member 30 and the side flashing member 35 of the first roof window 1 and between the claddings 32, 34 on the two windows.

As is seen in FIG. 2, where side flashing members 35, 36 and the connector flashing member 33 has been removed, the connector flashing member covers a connector element 6, which is attached to a connector bracket 41 interconnecting the mounting brackets 11,21 of the two roof windows 1,2. The attachment of the connector element to the connector bracket may for example be achieved by passing bolts through openings 611 (see FIG. 3) in the connector element and through similar aligned openings in the connector bracket.

In FIG. 3, where the bottom covering 31 and the claddings 32,34 have also been removed, the detail marked III in FIG. 2 is seen more clearly.

The middle flashing member 30 has a bent edge 301 serving as an engagement section, which projects into the gutter on the exterior side of the connector element 6. The engagement with the flange 621 defining the longitudinal edges of the gutter prevents the middle flashing member from moving away from the connector element and from moving towards the interior. When the connector flashing member 33 is mounted on top and attached to the tubular attachment element 622, for example by means of a screw, the middle flashing member is further prevented from moving towards the exterior.

The connector element 6 is shown in more detail in FIGS. 4-6.

In this embodiment attachment sections 63 are provided on both sides of the open end of the gutter. Each attachment section 63 comprises a flange 631 defining an end surface at the second end, extending from the exterior side towards the interior side and being substantially perpendicular to the length direction L. Each flange is provided with an attachment element 632 on the end surface, here in the form of a frustoconical flange, which defines the opening of an elongate hollow extending into an elongate receiver 633 on the opposite side of flange 631. The elongate hollow extending into the receiver 633 is configured to receive a screw or a like fastener (not shown), which can be used for attaching a supporting element of a flashing assembly or other parts of a flashing assembly to the connector element 6. The fact that the attachment element 632 projects from the end surface means that it may engage with an opening or depression in or on a supporting element.

Turning now to FIGS. 7-11 an example of the mounting of a flashing assembly by means of a connector element 6 according to the invention is shown.

Figure 7:
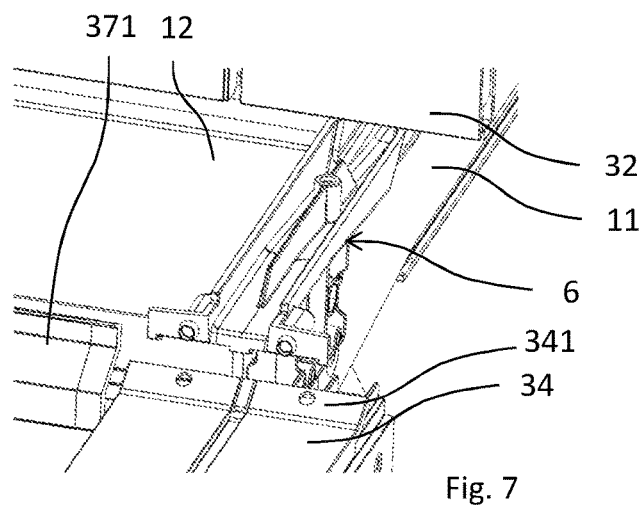

FIG. 7 shows the connector element 6 mounted on the connector bracket (not visible) as in FIG. 2 and extending between the cladding 32 of the first roof window and the cladding 34 of the second roof window. The mounting bracket 11 and frame 12 of the first roof window is seen in the back-ground and a first supporting rail 371 is attached to the top frame member (not visible) of the second roof window.

Figure 8:
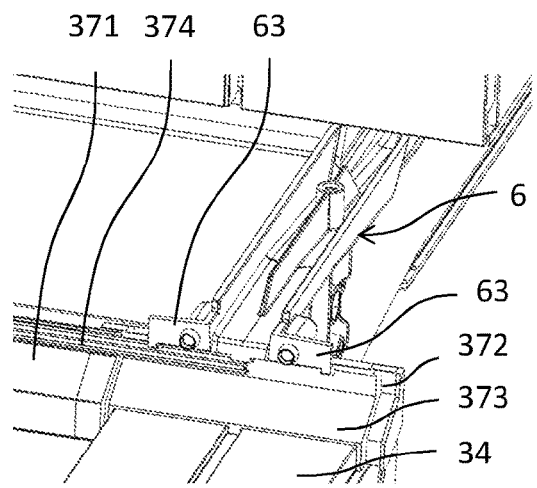

In FIG. 8 a supporting element 372 has been attached to the top corner of the frame of the second roof window so that is supports the upper end 341 of cladding 34 and a cover member 373 has been arranged on the exterior side of the cladding 34, so that the upper end 341 is sandwiched between the two. Furthermore, a first gasket 374 has been arranged on the first supporting rail 371, extending along its exterior edge and having a length so that it overlaps with the cover member 373 on the cladding 34. Both the cover member 373 and the first gasket 374 are arranged behind the attachment sections 63 of the connector element 6 and are thus prevented from moving away from the first roof window.

Figure 9:
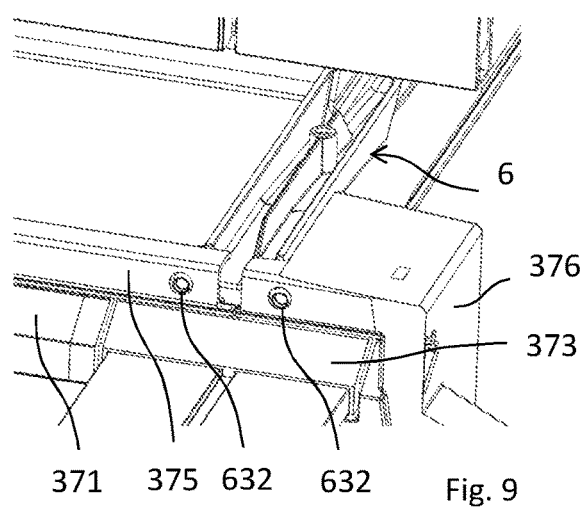

In FIG. 9 a second supporting rail 375 has been arranged on one side of the connector element 6 on top of the first gasket 374 and a side flashing supporting element 376 has been arranged on the other side of the connector element overlapping the cladding support element 372 and the cover member 373. Both the second supporting rail 375 and the side flashing supporting element 376 are provided with circular openings which have been fitted over the attachment elements 632 of the connector element 6 so that the attachment elements project through the openings.

Figure 10:
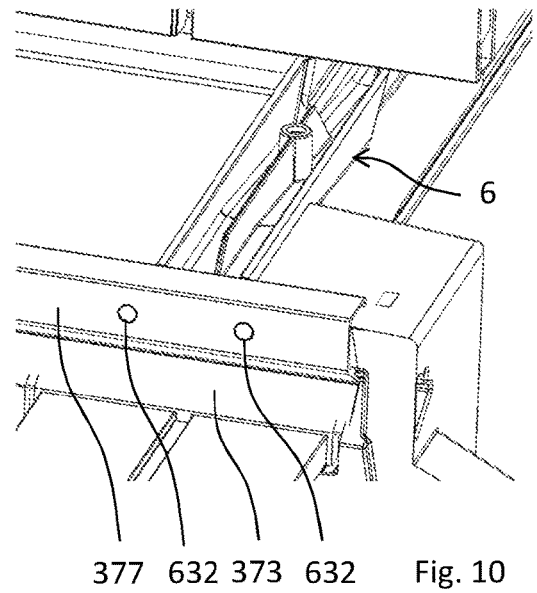

In FIG. 10 a second gasket 377 has been attached to both attachment elements 632, two openings in the gasket fitting over them so that this gasket 377 overlaps the gap between the second supporting rail 375 and the side flashing supporting element 376. The outer ends of the frustoconical flanges of the attachment elements 632 are substantially flush with the outer side of the second gasket 377.

Figure 11:
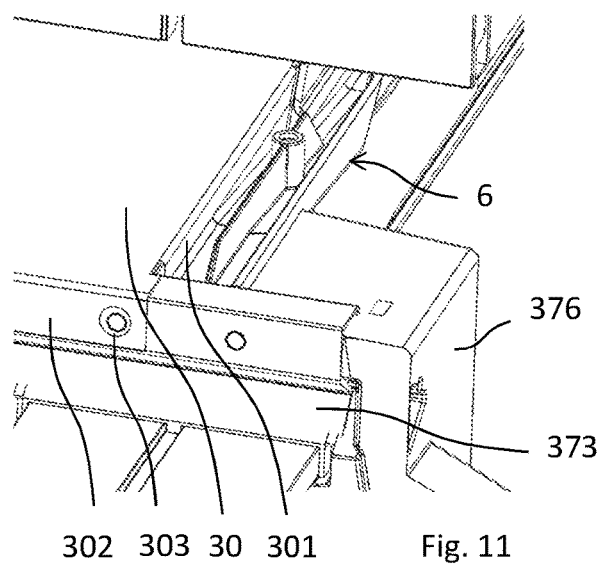

In FIG. 11 the middle flashing member 30 has been arranged with the bent edge 301 projecting into the gutter of the connector element 6 as described above and with a front edge 302 hooking over the second supporting rail 375 and the second gasket 377. The system of rails 371,375 and gaskets 374,377 thus provides a weather-proof connecting between the middle flashing member 30 and the second roof window. The middle flashing element 30 too has an opening 303, which in the correctly mounted state is aligned with the left-hand attachment element on the connector element 6. A screw or like fastener (not shown) may be passed through this opening 303 and directly into the elongate receiver 633 of the connector element 6.

The side flashing member 35 (shown only in FIG. 1) is provided with a similar opening fitting with the right-hand attachment element 632 and corresponding elongate receiver 633, and the connector flashing member 33 has two openings matching the position of the attachment elements 632 in the same way as described for the second gasket 377. This means that when the connector flashing member 33 has been arranged on top of the middle flashing member 30 and the side flashing member 35, two screws or like fasteners passed through all of the aligned openings are sufficient for securing all three flashing members, the supporting elements, and the gaskets to the connector element 6 and thus indirectly to the load-bearing structure. This provides for a simple, reliable, and cost-efficient attachment of the flashing assembly.

It is noted that the embodiment shown and described with reference to the drawing is not to be regarded as limiting the invention, which is defined by the claims. This for example means that some of the supporting elements and gasket described with reference to FIGS. 7-11 may be left out or modified and that other elements may be added. Likewise, the connector element 6 may have a different shape than what is shown. For example, the attachment sections 63 may be embodied differently, and it is particularly contemplated that they may be provided with female attachment elements instead of the male parts constituted by the frustoconical flanges 632. It is also contemplated that supporting elements may be attached to the connector element 6 by a snap-locking engagement.

Finally, it is noted that the design of the gutter of the connector element 6 and the engagement with the middle flashing member 30 may be achieved in many different ways from what is shown and described. For example, the middle flashing member 30 may be without the bent edge 301.

LIST OF REFERENCE NUMBERS

1 First roof window
11 Mounting bracket
2 Second roof window
21 Mounting bracket
3 Flashing assembly
30 Middle flashing member
301 Bent edge
302 Front edge
303 Opening
31 Bottom covering
32 Cladding
33 Connector flashing member
34 Cladding
35 Side flashing members
36 Side flashing members
371 First supporting rail
372 Supporting element
341 Upper end
373 Cover member
374 First gasket
375 Second supporting rail
376 Side flashing supporting element
377 Second gasket
41 Connector bracket
6 Connector element
611 Openings
621 Flange
622 Tubular attachment element
63 Attachment section
631 Flange
632 Attachment element
633 Elongate receiver
L Length direction

The invention claimed is:
1. A connector element for a flashing assembly for use in a roof window arrangement in an inclined roof structure including at least two roof windows, said connector element being configured for being arranged with an exterior side facing an exterior in a mounted state, an interior side facing the inclined roof structure, a first end facing a first roof window, and a length direction of the connector element extending from the first end towards a second opposite open end, where the exterior side comprises a gutter with two longitudinal edges extending between the first and second ends, at least one of said longitudinal edges being configured for engagement with an engagement section of a flashing member, and where a connecting section on the interior side is configured for being connected to a bracket used for connecting a roof window to a load-bearing structure of the inclined roof structure, wherein the connector element is configured for being arranged with the first end at an outer side of a bottom frame member of the first roof window and the second end at an exterior side of the second roof window, the connector element comprises an end surface at the second end, said end surface extending from the exterior side towards the interior side and being non-parallel to the length direction, and at least one attachment element is provided on the end surface, said at least one attachment element being adapted for engagement with a supporting element of a flashing assembly wherein the at least one attachment element is offset horizontally from a vertical plane extending parallel to the length direction and passing through a point of the gutter that is equidistant from each of the two longitudinal edges of the gutter.

2. The connector element according to claim 1, where the end surface extends from one or both of the longitudinal edges away from the gutter.

3. The connector element according to claim 1, where the at least one attachment element includes a male part adapted for engagement with an opening or depression in or on a supporting element.

4. The connector element according to claim 1, where the at least one attachment element includes an elongate receiver adapted for receiving an elongate fastener.

5. The connector element according to claim 4, where a length direction of the elongate receiver is substantially parallel to the length direction of the connector element.

6. The connector element according to claim 1, where the end surface with the attachment element is provided on both sides of the gutter.

7. The connector element according to claim 6, where the end surfaces and attachment elements on the two sides of the gutter are substantially identical except for being mirror inverted, so that the connector element is substantially symmetrical.

8. A roof window arrangement for use in an inclined roof structure including at least two roof windows, where a first roof window is located above a second roof window when seen in a direction of inclination of the inclined roof structure, and a flashing assembly, said flashing assembly including at least one connector element arranged with a first end at an outer side of a bottom frame member of the first roof window and a second end at an exterior side of the second roof window, the at least one connector element having an end surface at the second end, said end surface extending from an exterior side of the connector element towards an interior side of the connector element and being non-parallel to a length direction of the connector element, and at least one attachment element being provided on the end surface, at least a middle flashing member extending between the two roof windows, and a supporting element adapted for supporting one or more flashing members, said supporting element being attached to the at least one attachment element of the connector element.

9. A method for weather proofing a roof window arrangement including at least two roof windows mounted on an inclined roof structure, a first roof window above a second roof window when seen in a direction of inclination of the inclined roof structure, said method comprising the following steps:

connecting a connecting section of a connector element to a bracket used for connecting a roof window to a load-bearing structure of the inclined roof structure, so that said connector element is arranged between the first roof window and the second roof window with an exterior side facing an exterior, an interior side facing the inclined roof structure, a first terminal end facing the first roof window and a second open terminal end being arranged at the second roof window, a length direction of the connector element extending from the first terminal end towards the second terminal end, arranging a middle flashing member so that it extends between the two roof windows and so that an engagement section of the middle flashing member is in engagement with a longitudinal edge delimiting a gutter extending between the first and second terminal ends on the exterior side of the connector element, attaching a supporting element of a flashing assembly to an attachment element provided on an end surface at the second terminal end of said connector element, said end surface extending from the exterior side towards the interior side and being non-parallel to the length direction, and arranging at least one flashing member of the flashing assembly so that it is supported by the supporting element.

10. The roof window arrangement according to claim 8, where the exterior side of the at least one connector element comprises a gutter having two longitudinal edges extending between the first and second ends of the at least one connector.

11. The roof window arrangement according to claim 10, where the end surface of the connector element extends from one or both of the longitudinal edges away from the gutter.

12. The roof window arrangement according to claim 11, where the at least one attachment element includes a male part adapted for engagement with an opening or depression in or on a supporting element.

13. The roof window arrangement according to claim 8, where the at least one attachment element includes an elongate receiver adapted for receiving an elongate fastener.

14. The roof window arrangement according to claim 13, where a length direction of the elongate receiver is substantially parallel to the length direction of the connector element.

15. The roof window arrangement according to claim 10, where the end surface with the attachment element is provided on both sides of the gutter.

16. The roof window arrangement according to claim 15, where the end surfaces and attachment elements on the two sides of the gutter are substantially identical except for being mirror inverted, so that the connector element is substantially symmetrical.

17. The roof window arrangement according to claim 13, where the elongate fastener is a screw.

18. The connector element according to claim 4, where the elongate fastener is a screw.

* * * * *